UNITED STATES PATENT OFFICE.

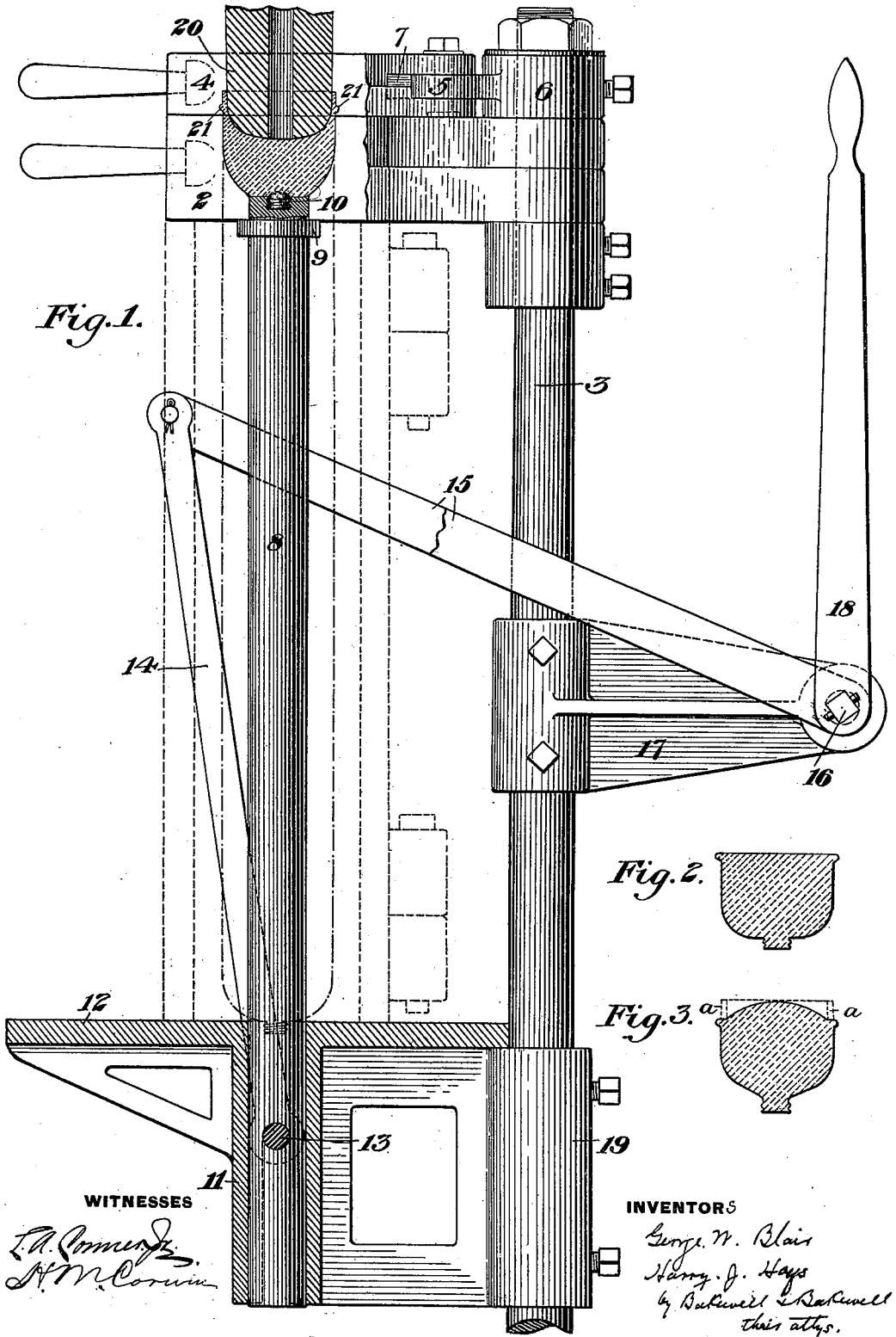

GEORGE W. BLAIR, OF PITTSBURG, AND HARRY J. HAYS, OF BALDWIN, PENNSYLVANIA, ASSIGNORS TO GEORGE W. BLAIR, TRUSTEE, OF PITTSBURG, PENNSYLVANIA.

METHOD OF AND APPARATUS FOR MAKING HOLLOW GLASS ARTICLES.

SPECIFICATION forming part of Letters Patent No. 596,355, dated December 28, 1897.

Application filed May 17, 1897. Serial No. 636,882. (No model.)

*To all whom it may concern:*

Be it known that we, GEORGE W. BLAIR, of Pittsburg, and HARRY J. HAYS, of Baldwin, in the county of Allegheny and State of Pennsylvania, have invented a new and useful Improvement in the Method of and Apparatus for Making Hollow Glass Articles, of which the following is a full, clear, and exact description, reference being had to the accompanying drawings, forming part of this specification, in which—

Figure 1 is a partial side elevation, partly in section, showing one form of apparatus for carrying out our invention; and Figs. 2 and 3 are sectional views of modified forms of blanks.

Our invention relates to the manufacture of hollow glass articles, whether such articles are to be afterward changed in form or are made in their final form, and is designed to greatly cheapen and improve the manufacture of such articles.

To that end it consists in forming a blank of any desired shape, supporting or holding up the base portion of the blank, and then elongating the blank vertically while at least a portion of the same is out of contact with the matrix in which it was formed.

It also consists in forming a blank, whether hollow or solid, in a matrix, releasing at least a portion of the blank from contact with said matrix, and then stretching the blank longitudinally, as well as in other features and combinations, as hereinafter more fully described, and set forth in the claims.

In the drawings, 2 represents a two-part press-mold hinged to and carried upon a suitable vertical standard 3.

4 is the two-part mold-ring, the parts of which are hinged to a lug 5, projecting from a ring 6, secured to the standard. The lug 5 is provided with a projection 7, arranged to prevent any side motion of the mold-ring when the parts are clamped together. Projecting through a hole in the bottom of the press-mold is a vertical supporting-rod 8, having a stop-ring 9, which abuts against the base of the mold in the uppermost position of the rod and provided in its upper end with a screw-threaded recess 10, which forms a central extension of the matrix-cavity of the mold, the parts of the rod around the recess supporting the base of the blank. This rod moves within a guide 11 in a suitable table 12 and is supported and moved by a horizontally-extending pin 13, which extends through vertical slots in the guide and at its ends is pivotally connected by links 14 with levers 15, secured at their outer ends to a shaft 16. The shaft 16 is carried in suitable bearings in a bracket 17, secured to the vertical support 3, and is rotated by a handle 18, keyed thereto. The table 12 may be carried on the same vertical support 3 by means of a suitable collar 19, surrounding such support.

20 is the usual reciprocating plunger of the press, and 21 is a small annular recess in the sides of the cavity in the mold-ring, in which a small projecting ring is formed upon the glass blank, so as to secure the same therein.

The operation is as follows: The parts of the mold and the mold-ring being in the position shown and the plunger being raised a suitable quantity of glass is dropped into the mold-cavity. The plunger 20 then being depressed the glass is forced into all parts of the mold-cavity, thus securing the upper end to the mold-ring and the lower end to the vertical support 8. The parts of the press-mold 2 are then separated and moved apart, so as to release them from the glass. The blank is supported by the operator, who by means of the hand-lever 18 holds up the support 8, and air then being allowed to pass down through the plunger the blank is expanded and the operator gradually allowing the support 8 to move downwardly or forcibly moving the same down when its gravity is not sufficient to effect the purpose draws out and elongates the blank, the air-pressure being maintained upon its interior. This operation is continued as far as desirable, the glass being gradually drawn or stretched and expanded into the form of a glass cylinder or "roller." The elongation of the blank is controlled by holding or supporting it by the support 8, so that its elongation is rendered rapid or slow, as needed.

If desired, a mold having a cylindrical mold-cavity may be placed around the blank before, during, or after its stretching in order to obtain a more truly cylindrical shape, and we have shown such a mold in dotted lines in Fig. 1. This mold, however, is not necessary to the formation of the cylinder, as we have found in practice that these cylinders, suitable for cracking and flattening into window-glass, may be formed without the use of a blow-mold.

If desired, molds having cavities arranged to form chimneys, globes, or any hollow glass articles may be placed about the blank either before, during, or after its stretching and the desired articles obtained by stretching and at the same time or thereafter expanding the blank into the mold-cavity.

We have shown the blank as having its upper portion entered by the plunger, so as to make such portion hollow, but this is not necessary, and we may form other blanks without this hollow portion—such, for instance, as shown in Figs. 2 and 3. In Fig. 3 we show an upwardly-projecting lip or ring $a$, which may be formed upon the upper end of the blank shown in this figure.

It will be noticed that the blanks are made narrower at the end which is moved in elongating. This, as well as the seizing of the blank at the center, is found to be important in that it gives an even flow and regular elongation to the blank.

It will be noticed that the blank is pressed so that the greater body of glass is below (beyond) the pressing device or plunger. The consequence is that such body of glass is not chilled, but retains its heat and constitutes an easily-extensible plastic mass, from which the article can be elongated vertically, while a portion of the same at least is out of contact with the matrix, and by "elongation" we mean extending into hollow form by any means, whether by a mechanical stretcher or otherwise. This we consider to be broadly new.

Although we prefer to expand the glass by blowing in air, it may be expanded or prevented from collapsing by other means—such, for instance, as by rotating the article, so that the centrifugal force will hold out the sides of the blank—and by the word "expanding" in the claims we wish to cover this prevention of collapsing during the stretching in any suitable way.

The advantages of our invention will be apparent to those skilled in the art, since the operation of forming hollow glass articles (whether such articles be afterward changed in form—as, for instance, by cracking and flattening into a sheet—or be in final form, as where a mold having a mold-cavity in the form of a chimney or other desired article is placed about the blank) is greatly cheapened and facilitated. The use of skilled labor is almost entirely eliminated and the capacity of output is enormously increased.

The advantages of the invention in the manufacture of glass pipe will be obvious, since long lengths with suitably-shaped male and female end portions may be easily and quickly formed with substantially uniform sides and contour and without the use of skilled labor, a cylindrical mold being preferably employed to surround the stretched blank.

The blank after its formation by pressing or otherwise may, if desired, be removed to another table or machine, wherein either one or both end portions are moved vertically, so as to stretch and elongate the glass, air being supplied or other means employed to expand the blank during stretching, and an inclosing shaping-mold being employed or not, as desired. Means may be provided for rotating the support and the blank or for rotating the mold, or both, during the expanding and stretching, and many other changes may be made without departure from our invention.

What we claim is—

1. The method of forming hollow glass articles, consisting in forming a blank, elongating it vertically while at least a portion of the sides of the blank is out of lateral contact with the matrix in which it was formed and supporting the bottom of the blank and thereby controlling its elongation.

2. The method of forming hollow glass articles, consisting in forming a blank in a mold, releasing at least a portion of the sides of the blank from said mold, and drawing out the blank vertically.

3. The method of forming hollow glass articles, consisting in pressing a blank in a mold, securing the upper end of the blank, releasing the sides of the blank from the press-mold, and expanding and drawing out the said blank downwardly.

4. The method of making hollow glass articles, consisting in forming a blank, seizing the center only of one end of the same, and elongating and expanding the same.

5. The method of making hollow glass articles, consisting in forming a blank, seizing the center only of one end of the same, supporting the glass around said central point of attachment, elongating the same vertically, and forcing air therein.

6. The method of making hollow glass articles, consisting in forming a blank, elongating the same while its body is out of contact from the matrix in which it was formed, and thereafter expanding the elongated blank into contact with a matrix.

7. In apparatus for forming hollow glass articles, the combination with a mold in which a glass blank is formed, of means for releasing at least a portion of the blank therefrom, and a stretcher arranged to move the blank vertically after its release.

8. In apparatus for forming hollow glass articles, the combination with a press-mold in which a blank is formed, of means for releasing a portion only of the blank therefrom, means for holding one end of the blank, and means for stretching the blank longitudinally and expanding it into form.

9. The combination with a press-mold, of a mold-ring having means for securing the blank thereto, means for releasing the mold from the blank, and a vertically-movable support for the blank arranged to stretch the same vertically.

10. In apparatus for forming hollow glass articles, the combination with a mold in which a glass blank is formed, of means for releasing the blank therefrom laterally, a vertically-acting stretcher arranged to elongate the blank after its release, and a fluid-supply arranged to expand the blank during stretching.

11. The combination with a blank-forming matrix, of means adapted to seize the blank formed therein at the center only of one end, while the other end is held by the matrix, and a stretcher arranged to elongate the blank.

12. The combination with a blank-forming matrix, of vertically-acting mechanism adapted to seize the center only of the bottom portion of the blank, and a support for the blank surrounding the said center.

13. The combination with a blank-forming matrix, of means for releasing therefrom at least a portion of the sides of the blank, and a vertically-acting support for the blank, said support being under the control of the operator.

14. The combination of a blank-forming matrix, a second matrix in vertical line therewith, means for releasing the body of the blank, a stretcher arranged to stretch the glass within the second matrix, and an air-inlet arranged to admit air for expanding the blank.

15. The method of forming hollow glass articles, consisting in pressing a hollow blank with the greater body of the glass beyond the pressing device or plunger, expanding the blank, elongating the blank vertically while at least a portion of the same is out of contact with the matrix and supporting the bottom of the blank and thus controlling its elongation.

In testimony whereof we have hereunto set our hands.

GEORGE W. BLAIR.
HARRY J. HAYS.

Witnesses:
G. I. HOLDSHIP,
H. M. CORWIN.